United States Patent [19]
Lin

[11] Patent Number: 6,148,770
[45] Date of Patent: Nov. 21, 2000

[54] AQUATIC LANDSCAPE ORNAMENTAL DEVICE

[76] Inventor: Kuo Jung Lin, No. 100, Lane 175, Cheng Kung Road, Tainan, Taiwan

[21] Appl. No.: 09/293,833

[22] Filed: Apr. 19, 1999

Related U.S. Application Data

[63] Continuation-in-part of application No. 09/061,964, Apr. 17, 1998, abandoned.

[51] Int. Cl.[7] .............................. A01K 63/00; G09F 19/02
[52] U.S. Cl. ............................................. 119/253; 40/426
[58] Field of Search .................................. 119/245, 246, 119/247, 248, 269, 253, 256; 40/406, 426, 409, 927; 446/153, 267, 134, 156, 158, 159, 330, 199; 428/13, 14, 17; D30/103

[56] References Cited

U.S. PATENT DOCUMENTS

| | | | |
|---|---|---|---|
| 1,188,198 | 6/1916 | Oshima | 428/17 |
| 1,471,885 | 10/1923 | Dessau | 40/406 |
| 3,239,956 | 3/1966 | Canonica, Jr. | 40/426 |
| 3,425,157 | 2/1969 | Hartsock | 446/134 |
| 3,535,805 | 10/1970 | Peiperl | 40/406 |
| 3,650,056 | 3/1972 | Walton | 40/406 |
| 4,578,044 | 3/1986 | Saitoh | 446/134 |
| 4,691,459 | 9/1987 | Butler | 40/406 |
| 5,050,876 | 9/1991 | Chuang | 273/456 |
| 5,301,444 | 4/1994 | Horiuchi | 40/426 |
| 5,435,086 | 7/1995 | Huang | 40/426 |
| 5,463,826 | 11/1995 | Horiuchi | 40/426 |
| 5,603,994 | 2/1997 | Su | 428/11 |
| 5,685,096 | 11/1997 | Horiuchi | 40/426 |
| 5,884,423 | 3/1999 | Lo | 40/410 |

FOREIGN PATENT DOCUMENTS

| | | | |
|---|---|---|---|
| 942856 | 5/1956 | Germany | 40/426 |
| 404201498 | 7/1992 | Japan | 40/427 |
| 12285 | of 1911 | United Kingdom | 40/426 |

*Primary Examiner*—Michael J. Carone
*Assistant Examiner*—Son T. Nguyen
*Attorney, Agent, or Firm*—Bacon & Thomas, PLLC

[57] ABSTRACT

An aquatic ornamental landscape device includes a main portion provided in a water tank and made of a soft material with its specific weight not larger than that of the water so as to float in the water tank, and connected with a down leading member to stay at a certain location without hampering the main portion from swinging or wriggling, a magnetic member provided in the main portion, and a magnetic inducing base provided at the outer side of the water tank and containing a hollow housing to accommodate a motor and a gear set driven by the motor while an axial of the gear set is connected also to a magnetic member which is driven and rotates to generate changed magnetic field against the water tank for the main portion to stay in its place and naturally swing or wriggle when subject to the alternative magnetic force of attraction and repulsion between the magnetic members in the main portion and the magnetic inductive base.

15 Claims, 4 Drawing Sheets

AQUATIC LANDSCAPE ORNAMENTAL DEVICE

This present invention is a continuation-in-part of application Ser. No. 09/061,964, filed Apr. 17, 1998, entitled "An Aquatic Landscape Ornamental Device" now abandoned.

BACKGROUND OF THE INVENTION

This invention relates to an aquatic landscape ornamental device, particularly to one that permits the real-life like natural swinging or wriggling of the ornaments in a water tank.

A conventional aquatic landscape ornamental device has faked grass and corals arranged in an aquarium or a fish globe fixed dead at the bottom of the aquarium, and they are fixed dead without natural swinging and/or wriggling as the real-life ones do, unless they are touched by fish or the water fowl cultured in the aquarium. The ornamental devices for not being natural, nor justifying the active fish or the water fowl kept in the aquarium do not live up to their purpose to improve the appearance of an aquarium.

A known prior art disclosed in an U.S. Pat. No. 5,257,596 includes suction cup means for fixing decorative plants or drift woods on inner surface of a viewing tank. As the stationary plants or drift woods do not necessarily swing or wriggle, they are well fixed therein by means of the suction cup means. But grasses, corals, or jelly fish should be arranged as swinging or wriggling, or they look like unnatural in an aquarium.

SUMMARY OF THE INVENTION

The invention has been devised to offer an aquatic ornamental landscape device, which has a main portion provided in a water tank to swing or wriggle by a magnetic member provided in the main portion and a magnetic inductive base provided in an outer side of the water tank so that magnetic attraction or repulsion may be produced between the magnetic member and the magnetic inductive base to force the main portion to swing or wriggle just like real creature so as to improve the appearance of the water tank or a water globe.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
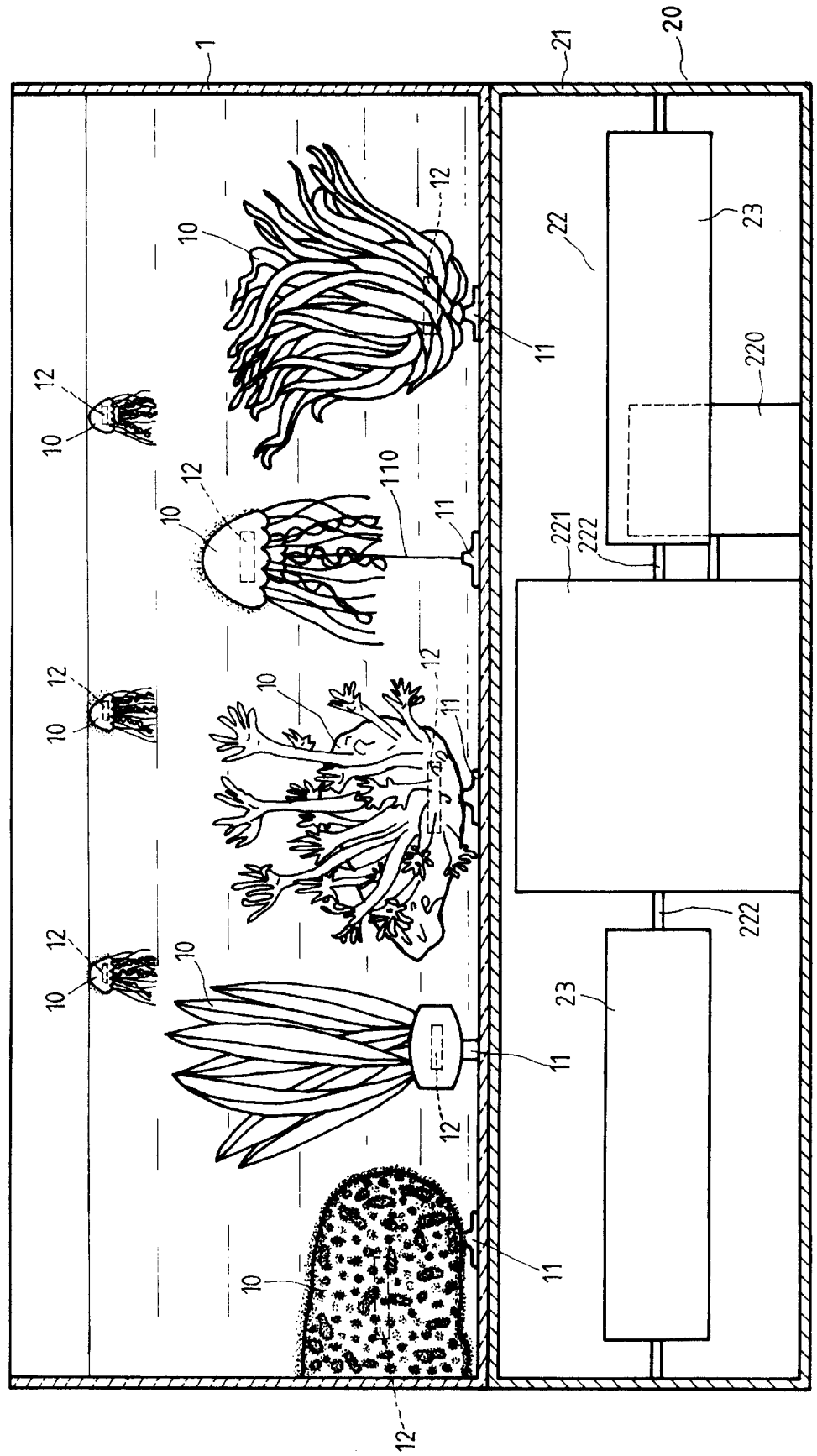
FIG. 1 is a plane view of the structure of the preferred embodiment of the present invention.
Figure 2:
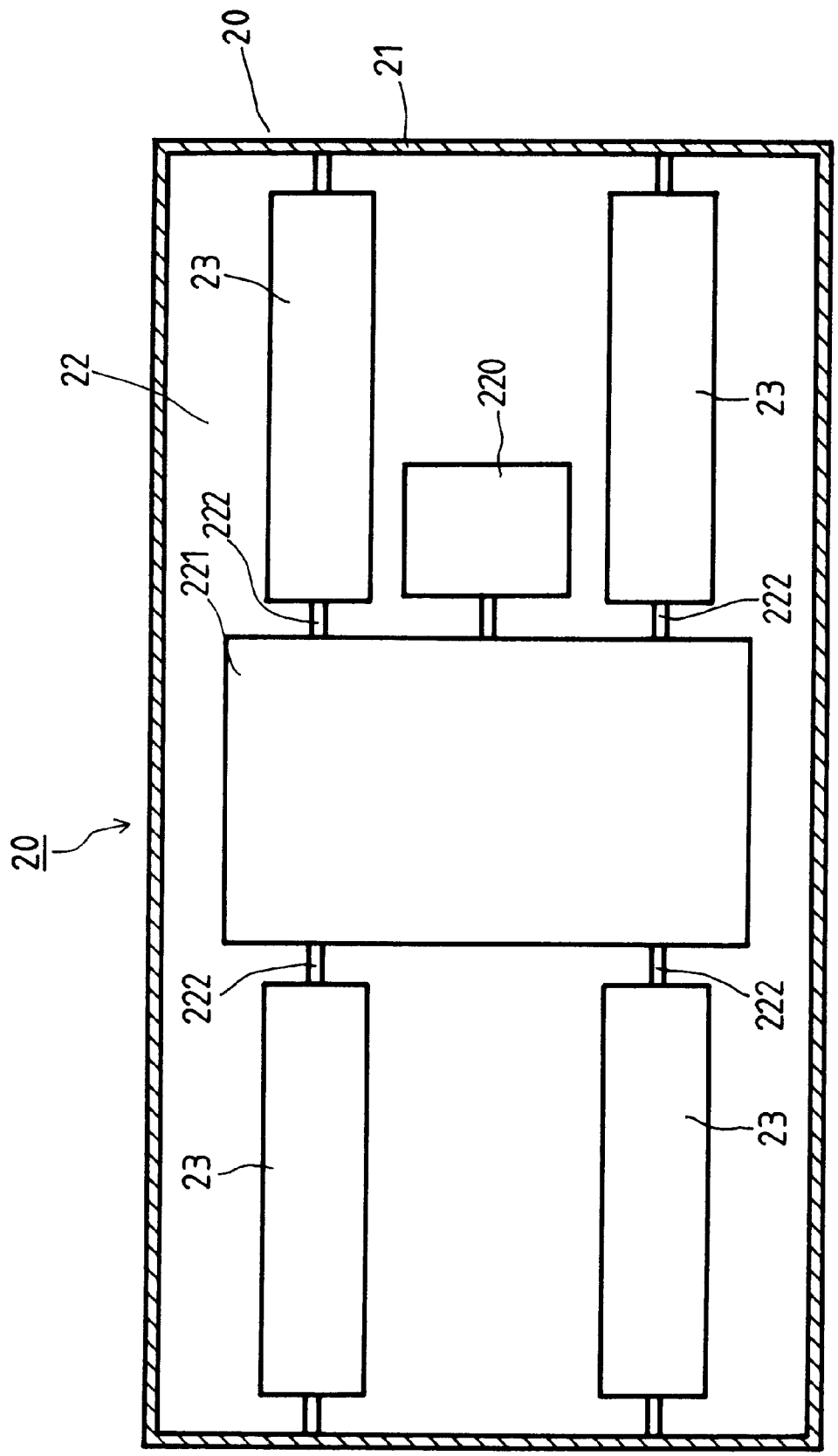
FIG. 2 is a top view of the magnetic inductive base structure of the preferred embodiment of the present invention.

The preferred embodiment of the present invention, as shown in FIG. 1, essentially consists of a main portion of an aquatic ornament 10, which may be provided in a water tank 1, (i.e. a container such as in the form of an aquarium or a fish glove), and the main portion 10 may be made in the form of a seaweed, a coral, a jelly fish or aquatic plant or creature, and of an extremely soft material with a specific weight smaller than that of water so that the main portion is able to float in the water, and a down leading member 11 (such as a sucker or weight) is provided at the bottom of the main portion 10 to pull it down to connect to the inner wall of the water tank 1, so that the main portion 10 does not float by itself above the water level, staying in the water, with the down leading member 11 not hampering the main portion 10 from swinging or wriggling, and a magnetic member 12 is provided in the main portion 10; and a magnetic inductive base 20, provided to the outer side of the water tank 1, and the base 20 contains a hollow housing 21, a drive system 22 including a drive motor 220, and a gear set 221 driven by the motor 220, and a magnetic member 23 connected to an end of an axle 222 in the gear set 221, in turn the base 20 causes the change in magnetic field against the water tank 1 and alternatively generates magnetic stress of both attraction and repulsion with the magnetic member 12 inside the main portion 10, consequently, the main portion 10 creates natural swinging or wriggling movement.

Essentially, the aquatic ornament in the ornamental landscape device is made of an extremely soft and light material, and the magnetic member 12 provided in the main portion 10, and the magnetic inductive base 20 as the source of changed magnetic field provided to the external side of the water tank alternatively generates mutual attraction and repulsion force between the magnetic member 12 inside the main portion 10 and the magetic inductive base 20 to drive the main portion 10 staying at its location while creating natural swing or wriggling as were the real aquatic creature (such as seaweed, coral, jelly-fish, etc.).

Figure 3:
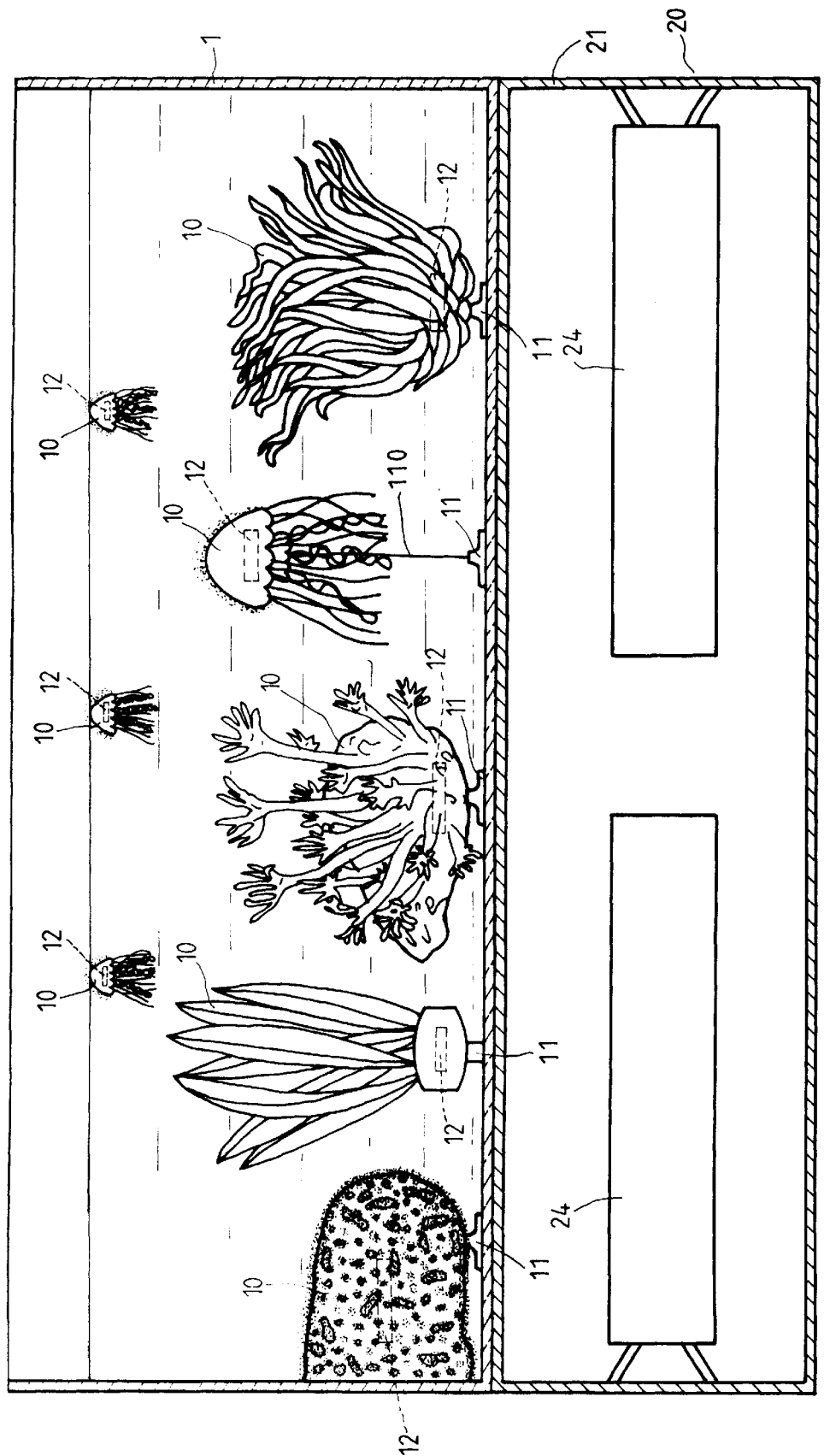
FIG. 3 is the structure lay-up of another embodiment of the present invention; and, FIG. 4 is the top view of the magnetic inductive base structure of the another embodiment of the present invention.
Figure 4:
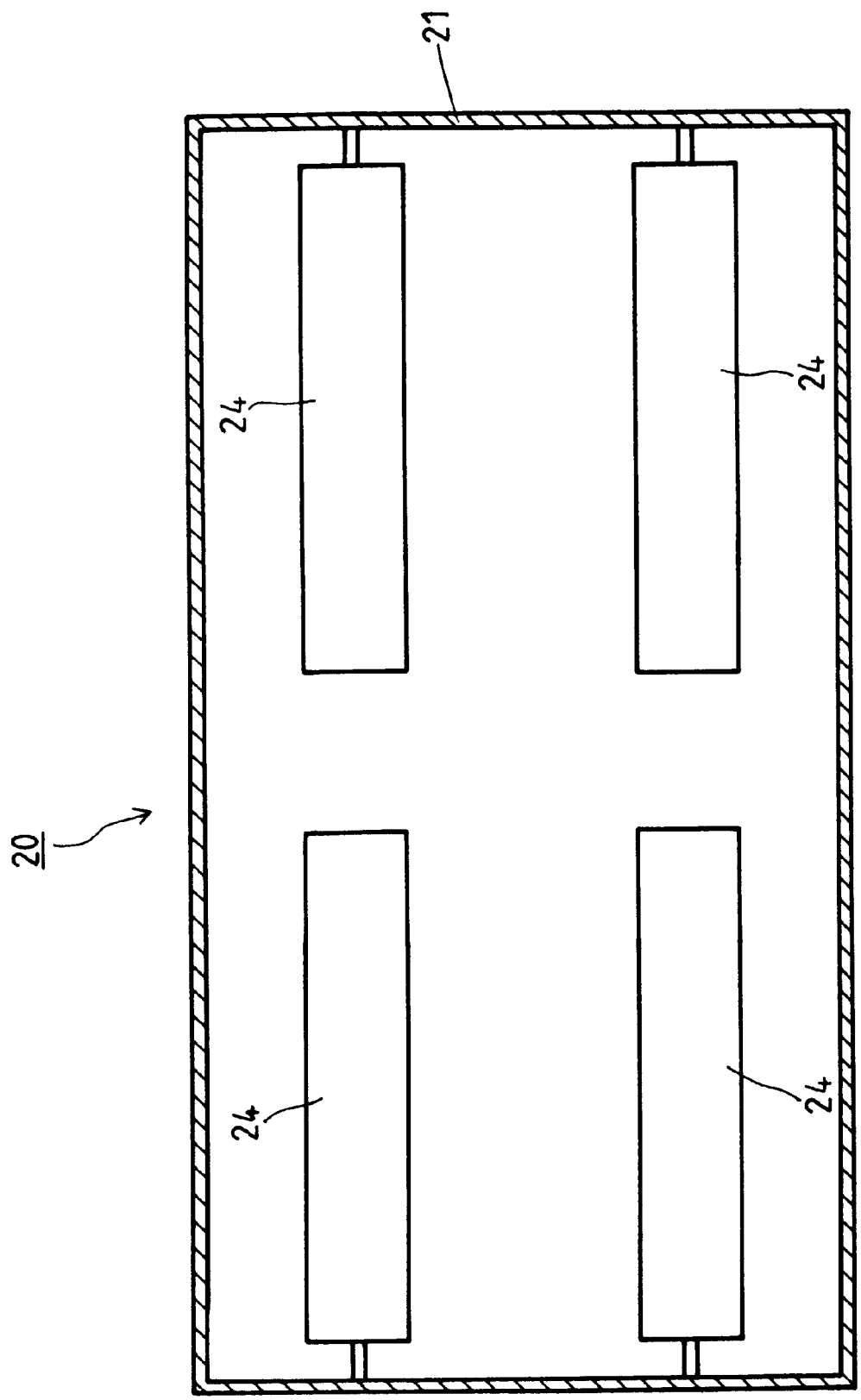

Furthermore, similar to FIGS. 3 and 4, it can redesign the inside part of the magnetic inductive base 20 to be an electro-magnet 24, which is a temporary magnet and only be induced by electrifying. Through various ways of electrifying, various changes of magnetic field will be induced. If the direction of the current is changed, the magnetism will be changed, or it will be served as on-off power-supply. Therefore, the electro-magnet 24, i.e. the magnetic inductive base 20 will have on-off magnetic force. There is magnetic field change in the water tank 1. The repulsion and attraction will be on-off in the magnetic member 12 inside the main portion 10. The natural swinging or wriggling motion can be observed in the main portion 10. Besides the magnetic inductive base 20 can also be provided to other outer side (left, right, front, rear or upper outer) of the water tank 1 other than its base outer side as illustrated in FIGS. 1 & 3 to create the similar changes in the magnetic field to cause the natural swinging or wriggling of the main portion 10.

To improve the swinging amplitude of the main portion 10, a flexible pull member 110 (a fine string of thread and hardly visible in the water is preferred) in a proper length can be provided to the top of the down leading member 11 and connected to the bottom of the main portion 10 or the main portion to swing or wriggle in an even more natural way when subject to the magnetic force.

The structure of the present invention rests on the main portion 10 of the aquatic ornament being made with an extremely soft and light (with its specific weight less than or close to that of the water) material which when dropped along in the water will soonest float on the surface. In the present invention, the magnetic member is provided inside the main portion when molded, and upon configuration, the down leading member 11 is provided to hold the main portion in place. The down leading member 11 may be in any form other than the sucker or weight as illustrated in FIG. 1 as long as the purpose is to keep the main portion from being floated on the surface, instead, somewhere between the bottom and the water surface in the water tank and not necessarily at the bottom as disclosed herein while the main portion maintains swinging or wriggling in the presence of the magnetic member 12 in the main portion 10 to the changed magnetic force lines resulted from the rotation of the magnetic member 23 provided in the magnetic inductive base 20 to close resemble the real aquatic creature moving gently or breathing to improve the landscape of an aquarium or a fish globe.

It should be emphasized that the main portion 10 made of a soft material having specific weight less or almost near that of the water is provided with the magnetic member inside, and placed to or float in the water, and decorative members like coral or seaweed are to be pulled down by the down leading members 11 or the flexible pull members 110 into somewhere in the water to swinging or wriggling to look like more real. As for the small jelly fish or micro creature (such as shown in FIGS. 1 & 3), they do not need the down leading members or the flexible pull members 110, able to float up and down on the water surface and swinging or wriggling to look more real by means of changed magnetic field, acquiring extremely good ornamental effect.

Consequently the present invention has ornamental effect better than that of the U.S. Pat. No. 5,257,596, because the main portion itself produce swinging or wriggling movement as real creatures in the water tank, and the magnetic members provided in the main portion also force the main portion swing or wriggle by means of changed magnetic field to look more like real creature as well.

While the preferred embodiments of the invention have been described above, it will be recognized and understood that various modifications may be made therein and the appended claims are intended to cover all such modifications which may fall within the spirit and scope of the invention.

I claim:

1. An aquatic ornamental landscape devices comprising:
   a main ornamental portion provided in a water tank and made of a flexible material with its specific weight not larger than that of the water so as to float in the water in the water tank, said main portion having a magnetic member inside; and
   a magnetic inductive base provided outside the water tank for inducing a magnetic field change in said water tank and for causing said main portion to maintain a substantially stationary position and naturally swing or wriggle when subject to an alternative magnetic force of attraction and repulsion between said magnetic member in said main portion and said magnetic inductive base.

2. The aquatic ornamental landscape device as claimed in claim 1, wherein said magnetic inductive base contains a hollow housing containing a motor and a gear set driven by said motor, an end of an axle of said gear set being connected to a magnetic member which is driven to rotate for creating the changing magnetic field in said water tank.

3. The aquatic ornamental landscape device as claimed in claim 1, wherein said magnetic inductive base contains a hollow housing containing an electromagnet which is electrified for producing the changing magnetic field in said water tank.

4. The aquatic ornamental landscape device as claimed in claim 1, wherein said main ornamental portion further includes a down leading member so that said main portion may freely swing or wriggle between the surface of the water and the bottom of said water tank.

5. The aquatic ornamental landscape device as claimed in claim 4, wherein said main ornamental portion further includes a flexible pull member provided between said main portion and said down leading member so that said main portion may rise up in the water so as to produce swinging or wriggling movement.

6. The aquatic ornamental landscape device as claimed in claim 4, wherein said down leading member is further provided with a weight to pull said main portion down to stay at a certain level in the water tank to swing or wriggle.

7. The aquatic ornamental landscape device as claimed in claim 1, wherein said magnetic field is induced in a substantially horizontal direction.

8. The aquatic ornamental landscape device as claimed in claim 7, wherein said magnetic field is induced by at least one electromagnet having a coil with a longitudinal axis arranged substantially horizontal.

9. The aquatic ornamental landscape device as claimed in claim 8, wherein magnetic field change is induced by changing the direction of a current flowing in the coil.

10. The aquatic ornamental landscape device as claimed in claim 8, wherein the magnetic field is induced by stopping and starting a current flow through the coil.

11. The aquatic ornamental landscape device as claimed in claim 7, wherein said magnetic field is induced by a first plurality of electromagnets, each having a coil with a longitudinal axis that is substantially horizontal and substantially colinear with the longitudinal axes of the other coils in the first plurality of electromagnets.

12. The aquatic ornamental landscape device as claimed in claim 11, wherein said magnetic field is induced by a second plurality of electromagnets, each having a coil with a longitudinal axis that is substantially horizontal and substantially parallel to the longitudinal axes of the coils in the first plurality of electromagnets.

13. The aquatic ornamental landscape device as claimed in claim 12, wherein magnetic field change is induced by changing the direction of a current flowing in the coil.

14. The aquatic ornamental landscape device as claimed in claim 12, wherein the magnetic field is induced by stopping and starting a current flow through the coil.

15. The aquatic ornamental landscape device as claimed in claim 7, wherein said magnetic field is induced by a plurality of electromagnets, each having a coil with a longitudinal axis that is substantially horizontal and substantially parallel to the longitudinal axis of the other coils in the second plurality of electromagnets.

* * * * *